United States Patent
Sibert et al.

(10) Patent No.: US 8,607,068 B2
(45) Date of Patent: Dec. 10, 2013

(54) METHOD OF STORING DATA IN A MEMORY DEVICE AND A PROCESSING DEVICE FOR PROCESSING SUCH DATA

(75) Inventors: Herve Sibert, Lemans (FR); Valere Delong, Arnage (FR)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/124,785

(22) PCT Filed: Oct. 22, 2009

(86) PCT No.: PCT/EP2009/063879
§ 371 (c)(1),
(2), (4) Date: Jul. 21, 2011

(87) PCT Pub. No.: WO2010/046435
PCT Pub. Date: Apr. 29, 2010

(65) Prior Publication Data
US 2011/0276809 A1    Nov. 10, 2011

(30) Foreign Application Priority Data
Oct. 23, 2008   (EP) ................................. 08305717

(51) Int. Cl.
   *G06F 12/14*   (2006.01)
(52) U.S. Cl.
   USPC ........................................ 713/189; 713/193

(58) Field of Classification Search
   USPC .......................................................... 713/189
   See application file for complete search history.

(56) References Cited

U.S. PATENT DOCUMENTS

| | | | |
|---|---|---|---|
| 6,980,660 B1 * | 12/2005 | Hind et al. ................... | 380/282 |
| 7,620,820 B2 * | 11/2009 | Furukawa et al. ............ | 713/189 |
| 2005/0236480 A1 * | 10/2005 | Vrotsos et al. ............... | 235/439 |
| 2007/0095927 A1 * | 5/2007 | Pesonen ....................... | 235/492 |
| 2012/0137137 A1 * | 5/2012 | Brickell et al. ............... | 713/182 |

FOREIGN PATENT DOCUMENTS

| | | |
|---|---|---|
| JP | 2003131950 A | 9/2003 |
| JP | 2008148132 A | 6/2008 |
| WO | 0031744 A1 | 6/2000 |
| WO | 2004097609 A1 | 11/2004 |

* cited by examiner

*Primary Examiner* — Matthew Smithers
(74) *Attorney, Agent, or Firm* — Coats & Bennett, P.L.C.C.

(57) ABSTRACT

In a method of storing data in a memory device, which data comprise content to be processed in a processing device in which the memory device is installed, the method comprises the steps of writing encrypted content (Enc_$K_{rand}$(flash_content) into the memory device before installing the memory device in the processing device, wherein the content was encrypted by use of a first key ($K_{rand}$), and accessing the first key ($K_{rand}$) and encrypting the first key ($K_{rand}$) by the aid of a second key (KIC; Ke) that is dependent on the processing device after installation of the memory device in the processing device, and writing the encrypted first key (EncSym_$K_{IC}$ ($K_{rand}$); EncAsym_$K_e$($K_{rand}$)) into the memory device.

17 Claims, 1 Drawing Sheet

METHOD OF STORING DATA IN A MEMORY DEVICE AND A PROCESSING DEVICE FOR PROCESSING SUCH DATA

The invention relates to data storing in a memory device.

The invention relates in particular to a method of storing data in a memory device, which data comprise content to be processed in a processing device in which the memory device is installed, and to processing device that is designed for processing of data.

Storing such data is typically used in the mobile phone manufacturing. In this type of business a firmware and/or software of the mobile phone is a key asset for the mobile phone manufacturer and/or a third party whose software is used to build the device firmware and/or software. The firmware and/or software, which is typically written into a flash memory device that is later on installed into a mobile phone, may contain proprietary algorithms. A disclosure of these algorithms to competitors must be prevented. When the software and/or firmware is stored in a flash memory the content of the flash memory is easily accessible by offline techniques, for example by removing the flash memory from the mobile phone device and by reading it out. Moreover, it would be possible to copy the flash memory content to a specific hardware containing also another flash memory and to connect it as a replacement to the original flash memory. This special hardware then enables to trace all the accesses to the flash memory, which would easily allow performing a reverse engineering of secret algorithms and functions. In order to prevent fraudulent usage of the firmware and/or software stored in the flash memory the content of the flash memory is typically encrypted. This prevents access to the plain content (the unencrypted content) of the flash memory. However, as the memory content can vary from one device to another, it is highly desirable for the result of the encryption to be dependent on the device and to be entirely different between two devices and between two different software versions installed consecutively on the same device. A conventional method that serves for this demand is the use of a symmetric encryption scheme with a key written in a special component of the mobile phone, e.g. the flash memory or an IC of the mobile phone device, e.g. a one-time programmable memory. As a starting point for the encryption scheme an initialization vector is used that can be a random number or a unique device version number. In order to have the best security level the key must be chosen randomly during the mobile device production and never be available outside the IC or the mobile phone, respectively.

This state of the art technique shows several drawbacks, which are for example the necessity of processing all the protected data in a different way for each device. This hampers sharing of the final memory content between several devices. Given the requirement that the key must be unique to the device, it is not possible to prepare the flash memory outside of the device, as this key must never be available outside the device. Concerning the production line on which the mobile device is manufactured, this situation results in a bottleneck as this adds a processing time for each device that is equal to the time necessary to encrypt the whole content of the flash memory while the mobile phone device is on the production line. Currently, in a single production line one unit is produced every T-seconds (typically less than 30 seconds), while the processing (encrypting of the content) of a device takes T' seconds (typically 5 minutes), this bottleneck is dealt with by inserting a point of processing of T'/T (typically approximately 10) mobile devices in parallel. Thus, it requires ten times the hardware (PCs . . . ) needed to perform the step for a single line. In conclusion, encrypting the entire flash content by a key that is depending on the device itself serves for a certain security level but it is certainly cumbersome and inefficient.

Therefore, according to an embodiment, a method of storing data in a memory device is proposed which improves security of the software and/or hardware to be stored in the memory device as well as improves manufacturing efficiency and to provide a processing device that is designed to efficiently utilize the method.

According to an aspect, a method of storing data in a memory device is provided, which data comprise content to be processed in a processing device in which the memory device is installed, the method comprising writing encrypted content into the memory device before installing the memory device in the processing device, wherein the content was encrypted by use of a first key, and accessing the first key and encrypting the first key by the aid of a second key that is dependent on the processing device after installation of the memory device in the processing device, and writing the encrypted first key into the memory device.

According to another aspect, a processing device is proposed comprising a memory device for storing of data, which data comprise encrypted content, wherein the content was encrypted by use of a first key and written into the memory device before the memory device was installed in the processing device, wherein the processing device is configured for accessing the first key and encrypting the first key by the aid of a second key, which second key is dependent on the processing device, after installation of the memory device in the processing device and writing the encrypted first key into the memory device.

The method permits in particular to split the processing of the flash memory into two encryption steps. The first encryption step is independent from the processing device in which the memory device is finally installed and takes time linear in the memory device content size. The second encryption step depends on the processing device in which the memory device is finally installed but requires a constant duration independent from the flash memory content size. As a particular advantage the first processing phase can be integrated into the flash production process, which is heavily parallelized, thus preventing the bottleneck in a production that would result from having to process the whole flash content once it is attached or installed to the device. Hence, sharing of the content amongst a number of memory devices is enabled in an early manufacturing phase, while finalization of the processing device dependent encryption can take place at a later stage during manufacturing of the processing device without any bottleneck effects to be taken into account.

Installing the memory device in a processing device may be performed by attaching the memory device with another IC that realizes the processing device, e.g. by soldering or utilizing other known techniques for affixing the memory device and the IC onto a circuit board. Installation of the memory device may also be understood as attaching the memory device to a ready manufactured end user device or attaching it to a sub assembly of such a end user device. In this context the processing device may be any end user device, e.g. be a mobile phone. However, any other end user device or professional device may be concerned for which the same basic problem as initially described exists. The memory device may be a memory of the flash type but also other non-volatile memory type may be concerned that allows one-time programming during manufacturing the memory or during initialization in a processing device. The invention may even be applied to hard disk based systems. The processing device or the subassembly of such a processing device, as the case may be, is finally designed to access the encrypted first key and encrypt the first key by means of the second key. As an advantage a content independent but device dependent security feature is enabled and its execution is not any longer dependent on the size of the content but is dependent on the size of the first key only. Thus by virtue of this feature the advantage is achieved that the duration for execution of this device dependent security measure is similar for various processing devices. In comparison to the encryption of the whole content the encryption of the first key is performed much faster, which accelerates the device manufacturing process significantly.

According to an embodiment the representation of the first key is the key itself. However, it has proved to be of a particular advantage if the representation data represent an indication from where the first key can be downloaded. Such a representation can e.g. be in the form of a link or an index to a database containing the first key. The database would be typically owned by the manufacturer of the processing device and serves for his demand not to provide the keys to the flash memory manufacturer. In this case the manufacturer of the processing device provides a set of data which are on the one hand the representation of the first key and on the other hand the encrypted flash content to the flash memory production process instead of delivering directly the plain flash content. This procedure allows preventing the memory device manufacturer from having direct access to the plain content.

In a another embodiment the method further comprises writing—before installing the memory device in the processing device—representation data that represent the first key into the memory device in a first location that is different from a second location in which the encrypted content is written and the step of accessing the first key—during or after installation of the memory device in the processing device—comprises accessing the representation data in said first location. This procedure allows for a structural utilization of the data stored in the memory device and enables the process-oriented approach to the manufacturing of the memory device as well as of the processing device. It further enhances security, as the location to which the representation data is written may be a secret by itself.

According to another embodiment the first key is a random key and the step of encrypting the content is performed by a symmetric algorithm using the random key. As an advantage, this step can preferably be performed during the memory device production or personalization. It is possible to use the same randomly drawn key for several memory devices, e.g. if the process is integrated to flash memory production where several flash memories are produced from the same content template.

According to another embodiment the step of writing the content key is performed by replacing the representation data with the encrypted first key. Accordingly, this provides the advantage that the randomly drawn first key used for encrypting the content of the memory device is not anymore available within the memory device or in other words is hidden, such that an attacker can not read the content of memory device anymore without knowing how to retrieve/access the first key.

According to an embodiment the second key is a symmetric key contained in the processing device. This measure allows using the secret key that is stored in the processing device for encryption as well as for decryption of the content of the memory device. During production of the processing device, e.g. a mobile phone, the memory device is attached to the processing device and the first key is retrieved by means of the representation data of the first key and then encrypted with the device secret key that is given by the second key. After finalizing of the manufacturing of the processing device, the processing device—e.g. when in use during its boot up sequence—decrypts the encrypted first key using the second key in order to obtain the first key and to decrypt the encrypted content of the memory device.

According to a further embodiment of the invention the second key is an asymmetric key that is public available and forms part of a key pair of which a private key is stored in the processing device. These measures provide the advantage that the memory device may contain the private key of the key pair of a public cryptographic scheme, such as RSA, and that the corresponding public key may be available outside of the IC, which is the basis for public key cryptography. By providing these measures the first key is encrypted using the public key on the production line. After finalization of the manufacturing of the processing device, the processing device—e.g. when in use during its boot up sequence—decrypts the encrypted first key by using the private key of the key pair in order to obtain the first key and to decrypt the content of the memory device. In contrast to the preceding embodiment this embodiment has an advantage if the target device for a given memory device is known beforehand, which is nevertheless a production constrained. Consequently it is not anymore necessary to store representation data of the first key in the memory device, rather the first key can be directly accessed, encrypted and the encrypted first key can be directly stored in the memory device during installation of the memory device in the processing device.

Summarizing the effects achieved by features of an aspect of the invention on a holistic scale the methods of storing data in the memory device are basically split in two steps. The first step is pre-processing of the memory device, where most the content is written already encrypted but independent from the processing device for which the memory device is dedicated. The key point is that this pre-processing step does not require knowledge of the exact processing device to which the memory device will be attached to or with which it will be installed. A second step is post-processing of the memory device to be performed in a different manner for each device. This step is performed when the memory device is already attached to or installed in the processing device. The key point to this second step is that the execution time of this phase does not depend on the already encrypted content size, because this second step only relates to a particular preparation of the first key to be used to decrypt the encrypted content of the memory device.

Other advantages and features of the invention will appear on examining the detailed description of embodiments, these being in no way limiting, and of the appended drawings in which.

In the drawings, like numbers refer to like objects throughout. Objects in the diagrams are not necessarily drawn to scale.

Figure 1:
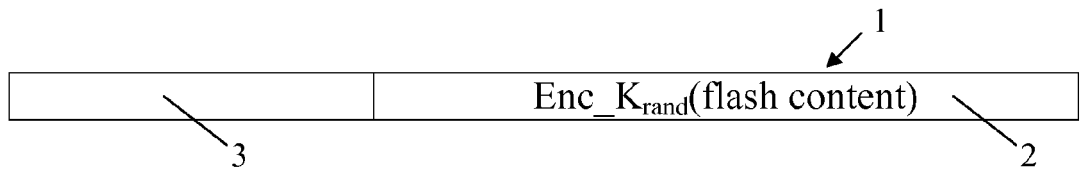
FIG. 1 shows a first phase of preparation of a data structure of a memory device by using an embodiment of a method of the invention.
Figure 2:
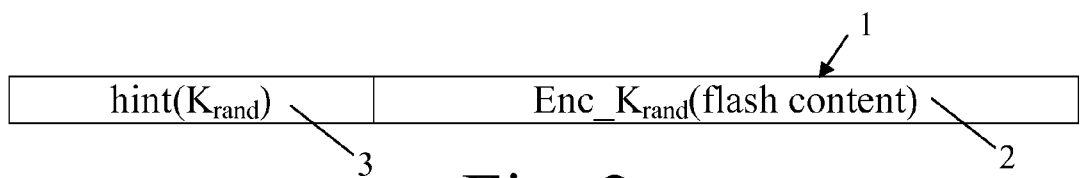
FIG. 2 shows a second phase of preparation of the data structure shown in FIG. 1.
Figure 3:
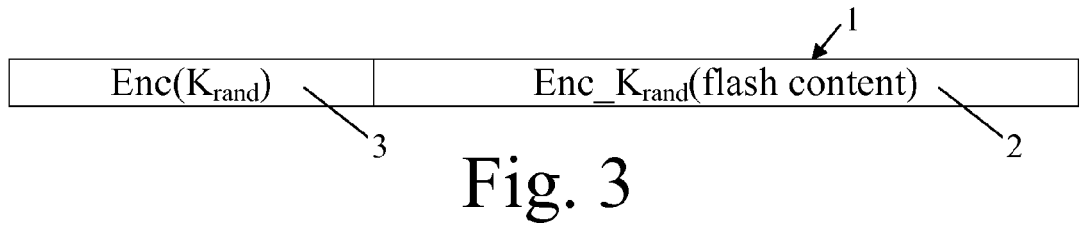
FIG. 3 shows a third phase of preparation of a data structure shown in FIG. 1.

In FIGS. 1 to 3 three phases of preparation of a data structure 1 of a memory device are shown. These phases allow visualizing a method of storing data in said memory device according to an embodiment of the invention. In general, the memory device stores data representing encrypted content Enc_$K_{rand}$(flash_content) to be processed in a processing device, in which the memory device is finally installed. The final data after installation of the memory device in the processing device further comprise a first key $K_{rand}$ for decrypting the encrypted content Enc_$K_{rand}$(flash_content) by the processing device, so that it can be processed. This first key $K_{rand}$ can be understood to be a content key, which was initially used to encrypt the content. The handling of the content and the first key will be elaborated in more details in the following by use of the figures.

The data structure 1 is split in two fields, which are a content field 2 that is used for storing the encrypted content Enc_$K_{rand}$(flash_content) and a key field 3 that is used for storing data representing the first key $K_{rand}$ that is necessary for decrypting the content before or while processing it.

According to phase 1, which is visualized by means of FIG. 1, the first key $K_{rand}$ is randomly drawn and used to encrypt the content. The result is the encrypted content Enc_$K_{rand}$ (flash content) that is written into the content field 2. According to phase 2, which is visualized by means of FIG. 2, a hint hint($K_{rand}$) that enables accessing of the first key $K_{rand}$ is written into the initially empty key field 3 of the data structure 1. The hint is stored by means of representation data that make the first key $K_{rand}$ accessible. The hint may be the first key $K_{rand}$ itself or an indication from where the first key $K_{rand}$ can be retrieved or where it can be accessed, which may be realized by means of an index of a database that contains the first key $K_{rand}$. The manufacturer of the processing device could own the database. Providing only the index to the database allows the manufacturer of the processing device to hide the first key $K_{rand}$ from the memory device manufacturer and to deliver directly the encrypted content Enc_$K_{rand}$(flash content) to the memory device manufacturer while hiding the plane plain content.

In the third phase of preparation of the data structure 1, which is shown in FIG. 3, the representation data are used to retrieve or access the first key $K_{rand}$, which is therafter encrypted by a second key that is dependent on the processing device. This third phase of preparation is performed during or after installation of the memory device but preferably still on the production line of the processing device. In fact the second key is used to encrypt the first key $K_{rand}$ and the encrypted first key Enc($K_{rand}$) is consecutively stored in the key field 3. According to a preferred embodiment of the third phase the representation data stored during phase 2 in the key field 3 are overwritten or replaced by the encrypted first key Enc($K_{rand}$).

Figure 4:
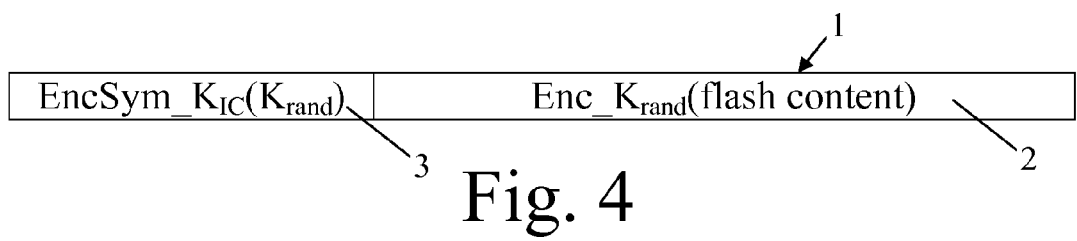
FIG. 4 shows a first embodiment of the third phase of preparation of the data structure according to FIG. 3.

According to a first embodiment the third phase makes use of a symmetric cryptographic scheme with a secret key within the integrated circuit to which the memory device is attached during installation in a processing device. Starting from the content of the data structure 1 given in the second phase we assume that the processing device contains a second key, which is a secret key $K_{IC}$ that is never available outside of the processing device and used for encryption/decryption in a symmetric scheme. This means that the same key $K_{IC}$ is used for both encryption as well as decryption. On the production line, when the memory device is attached to the processing device, the first key $K_{rand}$ is accessed by the aid of the representation data and then encrypted with the device secret key $K_{IC}$. The content of the key field 3 is then replaced with the encrypted first key EncSym_$K_{IC}$($K_{rand}$) of which the final result is shown in FIG. 4. When the processing device is ready for operation and switched on, so to say in use at the end user, the processing device first of all decrypts the encrypted first key EncSym_$K_{IC}$($K_{rand}$) using the device specific secret key $K_{IC}$ in order to obtain the first key $K_{rand}$, which is finally used to decrypt the encrypted content Enc_$K_{rand}$(flash_content) stored in the content field 2 of the data structure 1.

Figure 5:
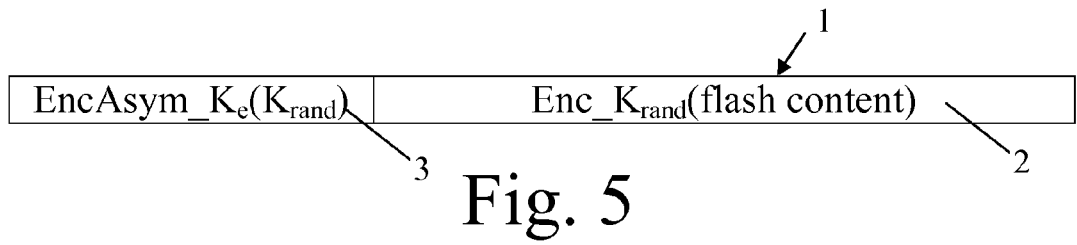
FIG. 5 shows a second embodiment of the third phase of preparation of the data structure according to FIG. 3.

According to a second embodiment the third phase makes use of an asymmetric cryptographic scheme with a private key within an integrated circuit to which the memory device is attached during installation in a processing device. Starting from the content of the data structure 1 given in phase 2 we assume that an IC of the processing device contains a private key $K_d$ of a key pair of a public cryptographic scheme such as RSA, and that the corresponding public key $K_e$ is available outside, which is the basis for public key cryptography. On the production line, when the memory device is attached to the processing device, the first key $K_{rand}$ that is accessed by the aid of the representation data is encrypted using the public key $K_e$. The content of the key field 3 according to phase 2 is then replaced with the encrypted first key EncAsym_$K_e$ ($K_{rand}$), which is shown in FIG. 5. In the ready manufactured processing device, e.g. while used by an end user during its boot sequence or thereafter, the processing device first of all decrypts the encrypted first key EncAsym_$K_E$($K_{rand}$) using the private key $K_D$ in order to obtain the first key $K_{rand}$. In turn the first key $K_{rand}$ is then used to decrypt the encrypted content Enc_$K_{rand}$(flash_content) stored in the content field 2. Typically, the target processing device for a given memory device is known before hand, which basically is a production constraint. Given this fact the second embodiment shows the advantage over the first embodiment that the second phase of intermediately storing the hint hint($K_{rand}$) in the key field 2 can be entirely avoided. This embodiment allows processing of phase one and directly proceeds with phase two where the first key $K_{rand}$ is directly accessed by the device manufacturer and the key field 3 is filled with the encrypted first key EncAsym_$K_e$($K_{rand}$) directly.

For both embodiments the advantage is achieved that the encryption of data for a memory device is split into two steps which is on one hand the pre-processing of the memory device that takes part at the memory manufacture side and the post-processing of the memory device that takes part at the processing device manufacture side without any content dependent manufacturing delays.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of protecting data in a memory device comprising at least first and second data storage locations, the data representing content to be processed in a processing device in which the memory device is installed, the method comprising:
   prior to installing the memory device in the processing device, encrypting the data using a first key;
   prior to installing the memory device in the processing device, writing the encrypted data to the memory device;
   installing the memory device in the processing device;
   after installing the memory device in the processing device, accessing the first key;

encrypting the first key using a second key that is dependent on the processing device; and writing the encrypted first key to the memory device.

2. The method of claim 1, wherein accessing the first key comprises accessing representation data that represent the first key.

3. The method of claim 1, wherein accessing the first key comprises accessing representation data indicating from where the first key can be retrieved.

4. The method of claim 1, wherein writing the encrypted data to the memory device comprises writing the encrypted data to the second location in the memory device, and further comprising:

prior to installing the memory device in the processing device, writing representation data that represent the first key to the first location in the memory device; and wherein accessing the first key comprises accessing the representation data in the first location of the memory device.

5. The method of claim 4, wherein accessing the representation data in the first location of the memory device occurs during installation of the memory device in the programming device.

6. The method of claim 4, wherein accessing the representation data in the first location of the memory device occurs following installation of the memory device in the programming device.

7. The method of claim 4, wherein writing the encrypted first key to the memory device comprises replacing the representation data with the encrypted first key.

8. The method of claim 1, wherein the first key is a random key and wherein encrypting the data using a first key comprises encrypting the data with a symmetric algorithm using the random key.

9. The method of claim 1, wherein the second key is a symmetric key contained in the processing device.

10. The method of claim 1, wherein the second key is an asymmetric key that is publically available and forms part of a key-pair, of which a corresponding private key is stored in the processing device.

11. A processing device, comprising:

a memory device operative to store of data comprising content encrypted using a first key and written in the memory device before the memory device was installed in the processing device; and a processing circuit operative to access the first key, encrypt the first key using a second key dependent on the processing device and write the encrypted first key to the memory device after installation of the memory device into the processing device.

12. The processing device of claim 11, wherein processing circuit is operative to access the first key by accessing representation data in the memory device that represents the first key.

13. The processing device of claim 11, wherein processing circuit is operative to access the first key by accessing representation data in the memory device that comprises indication from where the first key can be retrieved, and retrieving the first key.

14. The processing device of claim 13, wherein the processing device is operative to write the encrypted first key into the memory device by replacing the representation data with the encrypted first key.

15. The processing device of claim 11, further comprising memory storing the second key.

16. The processing device of claim 1, wherein the second key is an asymmetric key that is publically available and forms part of a key-pair, together with a corresponding private key, and further comprising memory operative to store the private key.

17. The processing device of claim 11, wherein the processing circuit is further operative to decrypt the encrypted first key using the second key, and to decrypt the encrypted content stored in the memory device using the first key.

* * * * *